(12) United States Patent
Reis et al.

(10) Patent No.: US 10,639,635 B2
(45) Date of Patent: May 5, 2020

(54) DEVICE AND METHOD FOR HANDLING LIQUID

(71) Applicant: Biosurfit, SA, Lisbon (PT)

(72) Inventors: Nuno Alexandre Esteves Reis, Lisbon (PT); Tania Moura Pires De Andrade Tenreiro, Lisbon (PT); Miguel Joao Marques Barreiros, Lisbon (PT)

(73) Assignee: Biosurfit, SA, Lisbon (PT)

( * ) Notice: Subject to any disclaimer, the term of this patent is extended or adjusted under 35 U.S.C. 154(b) by 0 days.

(21) Appl. No.: 15/626,890

(22) Filed: Jun. 19, 2017

(65) Prior Publication Data
US 2018/0099274 A1  Apr. 12, 2018

(30) Foreign Application Priority Data

Oct. 7, 2016 (GB) ................................. 1617079.7
Oct. 7, 2016 (PT) ........................................ 109659

(51) Int. Cl.
*B01L 3/00* (2006.01)
*B01F 9/00* (2006.01)
(Continued)

(52) U.S. Cl.
CPC ........ *B01L 3/50273* (2013.01); *B01F 9/0003* (2013.01); *B01F 13/0059* (2013.01);
(Continued)

(58) Field of Classification Search
CPC ........... B01L 3/50273; B01L 3/502723; B01L 2400/0694; B01L 2200/10;
(Continued)

(56) References Cited

U.S. PATENT DOCUMENTS 6,063,589 A * 5/2000 Kellogg .............. B01F 13/0059
366/DIG. 3
2004/0116686 A1 6/2004 Akashi
(Continued)

FOREIGN PATENT DOCUMENTS

EP         2817519 B1    12/2014
WO   WO 2007/042219    *  4/2007
WO   WO 2010/077159 A1    7/2010

OTHER PUBLICATIONS

Search Report dated Oct. 7, 2016 for Portuguese Application No. 109659, 3 pages.
Robert Gorkin III et al., "Pneumatic pumping in centrifugal microfluidic platforms", Feb. 17, 2010, 10 pages.
Jens Ducrée et al., "The centrifugal microfluid Bio-Disk platform", Jun. 28, 2007, 13 pages.
(Continued)

*Primary Examiner* — Samuel P Siefke
(74) *Attorney, Agent, or Firm* — Patterson Thuente Pedersen, P.A.

(57) ABSTRACT

A liquid handling device having an axis of rotation about which the device can be rotated to drive liquid flow in the device. The device includes an upstream chamber comprising an outlet, a downstream chamber including a proximal portion radially inwards of a distal portion and including a first port disposed in the distal portion and a first conduit which connects the outlet of the upstream chamber to the first port of the downstream chamber. The first conduit extends radially inwards to a crest and radially outwards from the crest to the first port of the downstream chamber. A distance between the axis of rotation and the crest is greater than or equal to a distance between the axis of rotation and the outlet of the upstream chamber.

9 Claims, 9 Drawing Sheets

(51) Int. Cl.
B01F 13/00 (2006.01)
G01N 1/38 (2006.01)

(52) U.S. Cl.
CPC .......... B01L 3/502723 (2013.01); G01N 1/38 (2013.01); *B01F 2215/0037* (2013.01); *B01L 2200/0605* (2013.01); *B01L 2200/0621* (2013.01); *B01L 2200/0684* (2013.01); *B01L 2200/10* (2013.01); *B01L 2300/0803* (2013.01); *B01L 2300/0806* (2013.01); *B01L 2300/0848* (2013.01); *B01L 2300/14* (2013.01); *B01L 2400/0409* (2013.01); *B01L 2400/0694* (2013.01); *G01N 2001/386* (2013.01)

(58) Field of Classification Search
CPC ......... B01L 2300/0806; B01L 2300/14; B01L 2200/0684; B01L 2400/0409; B01L 2300/0848; B01L 2300/0803; B01L 2200/0621; B01L 2200/0605; G01N 1/38; G01N 2001/386; B01F 13/0059; B01F 9/0003; B01F 2215/0037; B01F 13/1016
See application file for complete search history.

(56) References Cited

U.S. PATENT DOCUMENTS

| | | |
|---|---|---|
| 2008/0206848 A1 | 8/2008 | Hagiwara |
| 2009/0137062 A1 | 5/2009 | Degenhardt |
| 2012/0039769 A1 | 2/2012 | Wo |
| 2013/0074962 A1* | 3/2013 | Garcia da Fonseca ..................... B01L 3/50273 137/597 |
| 2014/0356129 A1* | 12/2014 | Paust ........................ F04F 1/00 415/1 |
| 2016/0121329 A1 | 5/2016 | Kinahan |
| 2016/0214104 A1 | 7/2016 | Schwemmer et al. |

OTHER PUBLICATIONS

Maximilian Focke et al., "Centrifugal microfluidic system for primary amplification and secondary real-time PCR", Sep. 14, 2010, 3 pages.

International Search Report and Written Opinion for International Application No. PCT/EP2017/073653, dated Jan. 9, 2018.

* cited by examiner

DEVICE AND METHOD FOR HANDLING LIQUID

RELATED APPLICATIONS

The present application claims priority to Great Britain Application No. 1617079.7 filed Oct. 7, 2016 and Portuguese Application No. 109659 filed Oct. 7, 2016, each of which is hereby incorporated herein in its entirety by reference.

FIELD OF THE DISCLOSURE

The present invention relates to a device for handling liquid and, in particular, to a device which can be used for the mixing of two or more liquid volumes or for the sequencing of liquid flow. More particularly, though not exclusively, the present invention relates to a microfluidic device, for example a centrifugal microfluidic device.

BACKGROUND OF THE DISCLOSURE

Centrifugal microfluidic devices allow the mixing, sequencing, and control of volumes of liquids. The liquid may be caused to flow through such a device under the action of centrifugal force, by rotating the device about an axis of rotation. Such devices are sometimes known as 'lab on a disc' devices.

Processing of liquid in a centrifugal microfluidic device may require the mixing of two or more liquids, for example according to a mixing ratio. It may also be desirable to halt liquid flow through a structure of the device until such a time it is desired to re-start liquid flow.

SUMMARY OF THE DISCLOSURE

Aspects of the disclosure are set out in the independent claims. Further, optional features of embodiments are set out in the dependent claims.

In an aspect there is disclosed a liquid handling device having an axis of rotation about which the device can be rotated to drive liquid flow in the device. The device comprises an upstream chamber comprising an outlet and a downstream chamber comprising a proximal portion radially inwards of a distal portion and comprising a first port disposed in the distal portion. The device further comprises a first conduit which connects the outlet of the upstream chamber to the first port of the downstream chamber. The first conduit extends radially inwards to a crest and radially outwards from the crest to the first port of the downstream chamber. A distance between the axis of rotation and the crest is greater than or equal to a distance between the axis of rotation and the outlet of the upstream chamber. As such, the crest is either at the same radial position as the outlet of the upstream chamber or is radially outwards of the outlet of the upstream chamber.

The above structure facilitates the combination of a second liquid from the upstream chamber with a first liquid in the downstream chamber at a time, which may be controlled by controlling the rotational frequency of the device, an example of which will now be briefly described. Liquid flows within the device and the corresponding rotational protocol will be described in more detail below with reference to the drawings.

A first liquid may be introduced into the downstream chamber. The first liquid enters the first conduit and fills the first conduit up to a fill level of liquid in the downstream chamber. A second liquid is introduced into the upstream chamber. The first and second liquids may be transferred into the downstream and upstream chambers respectively from an upstream liquid handling structure under the action of centrifugal force, for example. The first liquid may be introduced in the downstream chamber prior to introducing the second liquid in the upstream chamber, or the liquids may be introduced simultaneously or in the reverse order, with the configuration of the chambers ensuring that the first liquid enters the first conduit before the second liquid.

As the second liquid is transferred into the upstream chamber under the action of centrifugal force, some of the second liquid enters the first conduit from the upstream chamber, thus trapping gas in the first conduit between respective liquids from the upstream and downstream chambers. Advantageously, by configuring the first conduit to have a crest, the device is more robust than if the first conduit did not have a crest. In particular, gas is trapped in the crest. As a result, the trapped gas is radially inwards (in the crest) of the liquid either side of the gas and under the action of centrifugal force, the liquid is kept radially outwards of the gas. An effect of this is that gas is not induced to escape through the liquid, under the action of centrifugal force, and vent into the upstream chamber, as the case might be in the absence of a crest.

Under continued rotation, flow from the upstream chamber into the first conduit causes an increase in pressure of the trapped gas, which is balanced by a corresponding displacement of the liquid in the first conduit into the downstream chamber resulting in a corresponding liquid column downstream.

The rotational frequency of the device may then be increased to a point where the liquid column that can be provided by the liquid downstream is overcome and the trapped gas is vented into the downstream chamber. At this point, liquid can flow from the upstream chamber into the downstream chamber in response to continued rotation.

As mentioned above, the first and second liquids may be transferred into the downstream and upstream chambers respectively from an upstream liquid handling structure under the action of centrifugal force, for example. Alternatively, the first and second liquids may be transferred into the downstream and upstream chambers respectively from an upstream liquid handling structure by other means, for example by capillary flow or pressure-driven flow. The upstream liquid handling structure can be configured in various ways, for example having a common liquid reservoir, or respective liquid reservoirs for the first and second liquids. The first and second liquids may also, in some embodiments, be introduced into the upstream and downstream chambers directly, for example by pipette.

The above-described structure may be used to combine two volumes of liquid at a particular time, the time being controllable by controlling the rotational frequency of the device. Advantageously, by trapping gas in the device, which is something which is generally avoided in liquid handling devices, in particular in microfluidic devices, and in particular by trapping gas in the conduit between respective liquids from the upstream and downstream chambers, the two liquid volumes can be kept apart until the rotational frequency is increased to a sufficiently high level, at which point the trapped gas is vented through the downstream chamber and liquid from the upstream chamber is transferred into the downstream chamber, where it combines with liquid in the downstream chamber. This can be achieved without having to stop rotation of the device (as must be done for a capillary siphon, for example).

In some embodiments, the first port of the downstream chamber is disposed in a radially-outermost aspect of the downstream chamber. Advantageously, this ensures that if there is liquid in the downstream chamber, the first port of the downstream chamber is filled with liquid and that there is liquid radially inwards of the first port. Thus there is a liquid head which can balance out the centrifugal pressure from the liquid from the upstream chamber and the pressure of the trapped gas until such a time that it is desired to combine liquid from the upstream chamber with liquid in the downstream chamber. In some embodiments, however, the first port is disposed in a side wall of the downstream chamber. In some embodiments, the first conduit extends radially outward the first port between the outlet and the crest. This may further facilitate controlling venting of the gas.

In some embodiments, the upstream chamber comprises a metering portion and an overflow portion. A wall of the upstream chamber extends radially inwards from the metering portion to a bend defining the fill level of the upstream chamber and radially outwards from the bend to an overflow portion, thereby separating the overflow portion from the metering portion. The outlet of the upstream chamber is disposed in the metering portion and the upstream chamber is configured such that when the second liquid enters the upstream chamber, it begins to fill the metering portion of the chamber. As a result, a fill level of the metering portion rises. Once this fill level rises to be radially inwards of the bend in the wall of the upstream chamber, which separates the metering portion from the overflow portion, liquid overflows into the overflow portion.

If the device is arranged such that the total volume of liquid which is present in the upstream chamber does not exceed the total, combined volume of liquid that can be contained in the metering and overflow portions, a pre-determined volume of liquid will be present in the metering portion. As the outlet of the upstream chamber is disposed in the metering portion, a pre-determined volume of liquid can be caused to flow out of the upstream chamber and subsequently into the downstream chamber. This may be advantageous if it is desired to combine a specific volume of the second liquid with the first liquid in the downstream chamber, for example to achieve a specific mixing ratio. It will be appreciated that the first liquid (in the downstream chamber) may also have a well-defined volume. This may be achieved by metering the first liquid in another structure which is upstream of the downstream chamber, for example.

In some embodiments, the device comprises an unvented cavity which is connected to the downstream chamber. In some embodiments, the unvented cavity may comprise an unvented chamber with a proximal portion radially inwards of a distal portion and may comprise a second port disposed in the distal portion. The unvented cavity may further comprise a second conduit which connects the downstream chamber to the second port of the unvented chamber. In some embodiments, the unvented cavity may comprise a channel, for example a channel with a dead end, a network of channels, a cavity, or any combination of these.

The unvented cavity may facilitate a reduction in the rotational speed at which the device must be rotated in order to transfer liquid from the upstream chamber into the downstream chamber, as will now be described.

As set out above, a first liquid is introduced into the downstream chamber and some liquid enters the first conduit from the downstream chamber. A second liquid is introduced into the upstream chamber and some liquid enters the first conduit from the upstream chamber, thus trapping gas in the first conduit between respective liquids from the upstream and downstream chambers. The device is then rotated to transfer more liquid from the upstream chamber into the first conduit. Also under the action of centrifugal force, liquid is transferred from the downstream chamber into the unvented cavity. As liquid flows into the unvented cavity, gas in the unvented cavity is compressed and a pressure of the gas increases. For a given rotational frequency, an equilibrium point will eventually be reached in which the pressure of the gas trapped in the unvented cavity balances the centrifugal pressure acting to urge liquid into the unvented cavity.

A result of some of the liquid being transferred out of the downstream chamber, into the unvented cavity, is that there is less liquid in the downstream chamber and hence less liquid to provide a liquid head to balance out the centrifugal pressure of the first liquid in the upstream chamber and in the first conduit (from the upstream chamber) and also the gas trapped in the first conduit. As such, the frequency at which the device must be rotated in order to transfer liquid from the upstream chamber into the downstream chamber is reduced, as the liquid head provided by liquid in the downstream chamber (and liquid in the first conduit from the downstream chamber) is easier to overcome.

Once the trapped gas has been vented into the downstream chamber and liquid from the upstream chamber has been transferred into the downstream chamber, the rotational frequency of the device may then be reduced. As a result, the gas trapped in the unvented cavity expands and forces liquid back into the downstream chamber, where it mixes with liquid already in the downstream chamber, some of which is from the upstream chamber. The rotational frequency of the device may then be increased again to transfer liquid in the downstream chamber into the unvented cavity (thus increasing a pressure of the gas trapped in the unvented cavity) and then decreased again in order to transfer liquid back out of the unvented cavity, into the downstream chamber. This may be done in order to mix the two liquids (from the upstream and downstream chambers). This process of increasing and decreasing the rotational frequency of the device to move liquid back and forth between the downstream chamber and the unvented cavity may be repeated one or more times.

In some embodiments, the unvented cavity comprises an unvented chamber which comprises a distal portion radially outwards of a proximal portion and the second port is disposed in the distal portion of the unvented chamber.

In some embodiments, the second conduit may be connected to the first conduit. In this way, the first port of the downstream chamber may be a common port, connected to both the first conduit and the second conduit. A point at which the second conduit is connected to the first conduit may be radially outwards of the first port of the downstream chamber. Advantageously, when liquid is present in the portion of the first conduit between the point of connection of the first and second conduits and the first port of the downstream chamber, this additional liquid (as compared to if the second conduit was connected to a port of the downstream chamber separate to the first port) serves to provide additional liquid head which may be useful in ensuring that the gas trapped in the first conduit is not vented into the downstream chamber before this is desired.

In other embodiments, the downstream chamber may have an additional, separate port, to which the second conduit is connected. This port may be disposed on the distal portion on the downstream chamber. In some embodiments, the additional port may be disposed in a radially-outermost aspect of the downstream chamber.

In the embodiments in which there is a separate additional port (or no unvented chamber/second conduit at all), an additional liquid head which may be useful in ensuring that the gas trapped in the first conduit is not vented into the downstream chamber before this is desired can be provided by extending the first conduit radially outward of the first outlet port of the downstream chamber before extending radially inwards to the crest.

In some embodiments, the device comprises a feature which defines the axis of rotation and which is configured to be coupled to a rotational element to drive rotation of the device. For example, the device may be a centrifugal disc, such as a microfluidic disc. The device, disc-shaped or otherwise, may comprise a central hole which is configured to engage with a spindle of a drive system, the spindle being coupled to a motor for driving rotation of the spindle, which in turn drives rotation of the engaged device.

In another aspect there is provided a method of sequencing liquid flows in a device comprising an upstream chamber, a downstream chamber and a first conduit which connects the upstream and downstream chambers. The method comprises filling the first conduit from the downstream chamber prior to liquid filling the first conduit from the upstream chamber, for example by transferring liquid into the downstream chamber and subsequently transferring liquid into the upstream chamber, to trap gas in the first conduit between respective liquids from the upstream and downstream chambers and rotating the device at a first rotational frequency and then a second rotational frequency greater than the first rotational frequency to vent the trapped gas into the downstream chamber and transfer liquid from the upstream chamber to the downstream chamber.

Advantageously, as mentioned above, by controlling the rotational frequency of the device, the time at which liquid from the upstream chamber is transferred into the downstream chamber can be controlled.

In some embodiments, as mentioned above, the device comprises an unvented cavity connected to the downstream chamber. In some embodiments, the unvented cavity comprises an unvented chamber and a second conduit which connects the downstream chamber and the unvented chamber. Rotating the device at the first rotational frequency causes liquid to be transferred from the downstream chamber to the unvented cavity. An advantage of this is, as described above, that the rotational frequency at which the device must be rotated in order to transfer liquid from the upstream chamber into the downstream chamber may be reduced.

In some embodiments, the method comprises rotating the device at or above a threshold frequency to transfer liquid from the downstream chamber into the unvented cavity such that the first port (of the downstream chamber) becomes free of liquid (i.e. it is emptied of liquid) and as a result, the gas trapped in the first conduit is vented into the downstream chamber and liquid from the upstream chamber flows into the downstream chamber.

In some embodiments, the method comprises rotating the device at or above a threshold frequency in order to transfer liquid from the downstream chamber into the unvented cavity such that a fill level in the downstream chamber falls such that is radially outwards of the first port of the downstream chamber. As a result, the first port becomes free of liquid, at which point the gas trapped in the first conduit is vented into the downstream chamber and liquid from the upstream chamber flows into the downstream chamber.

In some embodiments, the method comprises rotating the device at or above a threshold frequency in order to transfer all of the liquid in the downstream chamber out of the downstream chamber and into the unvented cavity. As a result, the first port of the downstream chamber becomes free of liquid, at which point the gas trapped in the first conduit is vented into the downstream chamber and liquid from the upstream chamber flows into the downstream chamber.

In some embodiments, the method further comprises rotating the device at a third rotational frequency lower than the second rotational frequency to transfer liquid from the unvented cavity to the downstream chamber. By slowing the device down, as described above, the gas trapped in the unvented cavity expands and forces liquid from the unvented cavity back into the downstream chamber. In some embodiments, rotating the device at the third rotational frequency may comprise rotating the device at the third rotational frequency prior to and/or subsequent to rotating the device at the second rotational frequency.

In some embodiments, the method comprises rotating the device at a fourth rotational frequency greater than the third rotational frequency, subsequent to rotating at the third rotational frequency, to transfer liquid in the downstream chamber into the unvented cavity. By increasing and decreasing the rotational frequency of the device between the third and fourth rotational frequencies in this way, liquid can be transferred back and forth, into and out of the downstream chamber. Advantageously, this promotes intermingling of the liquid. In some embodiments, the method comprises rotating the device at the third rotational frequency and the fourth rotational frequency prior to rotating the device at the second rotational frequency. In other words, liquid can be moved back and forth between the downstream chamber and the second conduit before liquid is caused to flow from the upstream chamber into the downstream chamber. In other embodiments, the method comprises rotating the device at the third rotational frequency and the fourth rotational frequency subsequent to rotating the device at the second rotational frequency. In other words, liquid is moved back and forth between the unvented cavity and the downstream chamber after liquid is caused to flow from the upstream chamber into the downstream chamber. In this way, the first and second liquids can be mixed with each other by moving liquid back and forth. In some embodiments, liquid may be moved back and forth in the way described both prior to and subsequent to causing liquid to flow from the upstream chamber into the downstream chamber.

In some embodiments, as well as being lower than the second rotational frequency, the third rotational frequency is also lower than the first rotational frequency.

In another aspect there is provided a method of implementing any of the methods described herein using a device as described.

It will be understood that the terms "vented" and "unvented" as used herein are used such that a vented chamber is connected to the atmosphere external to the device or a closed air circuit so that pressure can equilibrate as liquid flows in or out of respective ports, for example inlet and outlet ports, of the vented chamber. Conversely, an unvented chamber is neither connected to external air nor to a closed air circuit such that, once liquid fills any inlet and outlet ports of the unvented chamber any difference in respective flow rates in and out of the unvented chamber leads to a change in pressure in the unvented chamber. In other words, in an unvented chamber the only fluid flow paths in or out of the unvented chamber are through one or more liquid ports part of a liquid flow circuit of the device.

It will be understood that the cavities referred to herein may be described as vented or unvented, as the case may be.

Where the term "level" is used in relation to a chamber or other liquid containing structure, it will be understood that this does not necessarily refer to a straight level as would be observed in a chamber filled with liquid under gravity, but that the term includes curved levels which may be curved due to a centrifugal force acting on the liquid or due to surface tension effects. The term "level" refers to a geometric locus, e.g. relative to a centre of rotation.

Any reference to a fill level of a liquid containing structure (e.g. a chamber or conduit) rising will be understood to refer to the liquid level moving radially inwards, towards the axis of rotation. Similarly, any reference to a fill level of a liquid containing structure (e.g. a chamber or conduit) falling will be understood to refer to the liquid level moving radially outwards away from the axis of rotation.

It will be understood that reference to a structure 'A' being disposed radially inwards of a structure 'B' should be taken to mean that a distance between structure 'A' and the axis of rotation of the device is less than a distance between structure 'B' and the axis of rotation of the device.

Equally, it will be understood that reference to a structure 'A' being disposed radially outwards of a structure 'B' should be taken to mean that a distance between structure 'A' and the axis of rotation of the device is greater than a distance between structure 'B' and the axis of rotation of the device.

It will be understood that reference to a structure extending radially inwards should be taken to mean that the structure extends towards the axis of rotation. Equally, it will be understood that reference to a structure extending radially outwards should be taken to mean that the structure extends away from the axis of rotation.

BRIEF DESCRIPTION OF THE FIGURES

The following description of specific embodiments is made by way of example and illustration and not limitation, with reference to the drawings in which.

DETAILED DESCRIPTION OF THE FIGURES

Figure 1:
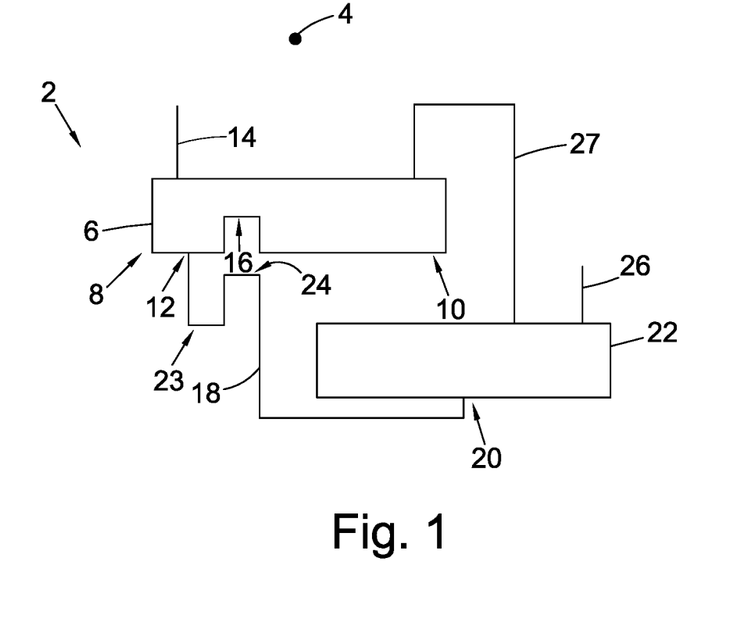
FIG. 1 illustrates schematically a liquid handling device for combining a second liquid with a first liquid at a point in time which may be controlled.

With reference to FIG. 1, the liquid handling device 2 is configured for rotation about an axis of rotation 4. The device 2 comprises an upstream chamber 6. The upstream chamber has an inlet 14 and comprises a metering portion 8 and an overflow portion 10. A portion 16 of a wall of the upstream chamber 6 extends radially inwards from the metering portion 8 to a bend and radially outwards from the bend to the overflow portion 10. The upstream chamber 6 comprises an outlet port 12 disposed in the metering portion 8. The outlet port 12 is disposed on a radially-outermost aspect of the metering portion. In some embodiments, the outlet port 12 of the upstream chamber 6 may be disposed elsewhere in the metering portion. In some embodiments, the upstream chamber 6 may not have an overflow portion at all.

The outlet port 12 of the upstream chamber 6 is connected to a first conduit 18, which in turn is connected to a first port 20 of a downstream chamber 22. The conduit 18 extends radially outwards from the outlet 12 of the upstream chamber 6 to a first bend 23 and then radially inwards from the first bend 23 to a crest 24. The conduit 18 extends radially outwards from the crest to the port 20 of the downstream chamber 22.

The port 20 of the downstream chamber 22 is disposed on a radially outermost aspect of the downstream chamber 22. In some embodiments, the port 20 may be disposed elsewhere in the downstream chamber, in a position which is radially outwards of a radially-innermost aspect of the downstream chamber. The downstream chamber 22 also comprises an inlet 26.

The device further comprises an air channel 27 which connects the upstream chamber to the downstream chamber. This allows gas displaced by the flow of liquid from the conduit 18 into the downstream chamber 22 to enter the upstream chamber 6. The air channel 27 may be in communication with atmospheric pressure or may be connected to an internal air circuit for equalising gas pressure as liquid flows through the device, for example via one of the chambers 6, 22. In some embodiments, both chambers 6,22 have separate connections to the internal air circuit or atmospheric pressure, in which case the air channel 27 can be dispensed with.

Liquid flows in the device will now be described with reference to FIGS. 2A to 2E and 3.

Figure 2A:
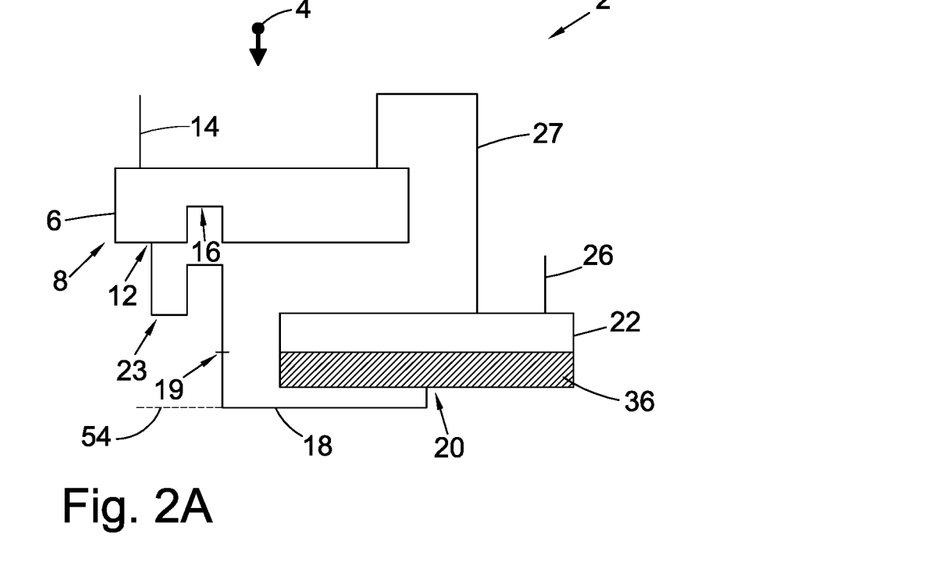
FIG. 2A illustrates schematically liquid flows within the device as illustrated in FIG. 1.
Figure 3:
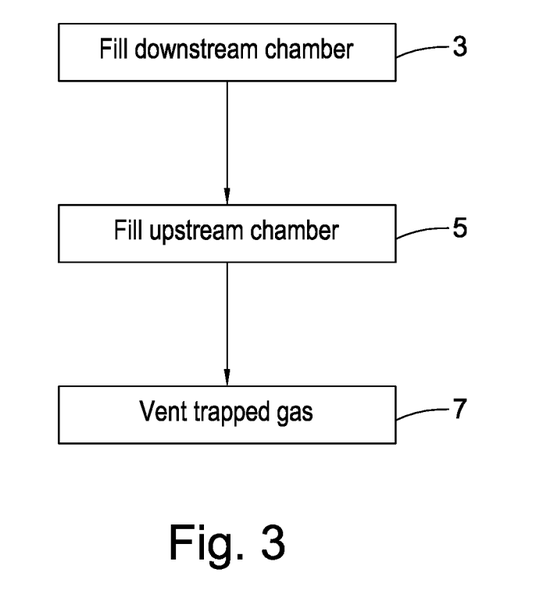
FIG. 3 illustrates a method of handling liquid.

With reference to FIGS. 2A and 3, as a first step 3, the device 2 is rotated and a first liquid 36 is transferred into the downstream chamber 22 via inlet 26 under the action of centrifugal force. Liquid enters the conduit 18 from the downstream chamber and fills the first conduit up to a level equal to a fill level of liquid in the downstream chamber 22. The fill level of liquid in the conduit 18 is indicated by a marker 19 in FIG. 2A.

Figure 2B:
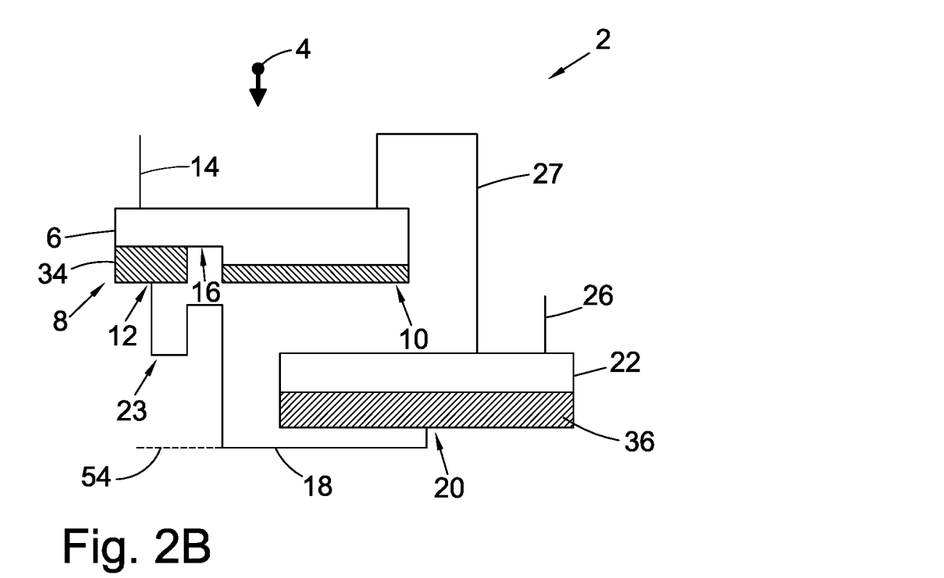
FIG. 2B illustrates schematically liquid flows within the device as illustrated in FIG. 1.

With reference to FIGS. 2B and 3, at step 5, once the first liquid has been transferred into the downstream chamber 22 and has filled the conduit 18 up to a level equal to a fill level of liquid in the downstream chamber 22, a second liquid is then transferred into the upstream chamber 6 via the inlet 14, under the action of centrifugal force. The second liquid 34 enters the upstream chamber 6 via the inlet 14 and begins to fill the metering portion 8. Some liquid also enters the conduit 18, thus trapping gas in the conduit 18 between respective liquids from the upstream and downstream chamber. As liquid enters the upstream chamber, a fill level of liquid in the upstream chamber rises. Once the fill has risen to be radially inwards of the bend in the portion 16 of a wall of the upstream chamber 6, liquid overflows into the overflow portion 10.

The following fill levels and positions are defined for use in the description that follows:

R1: the fill level of liquid in the upstream chamber

R2: the fill level of the second liquid (from the upstream chamber) in the first conduit R3: the fill level of the first liquid (from the downstream chamber) in the first conduit R4: the fill level of liquid in the downstream chamber A liquid head is provided by the second liquid (in the upstream chamber and the first conduit). The liquid head is proportional to the difference in the squares of the radial positions of the two ends of the liquid column, i.e. it is proportional to $R2^2-R1^2$. In order to balance this liquid head, as liquid enters the upstream chamber, some of the first liquid flows from the conduit 18 back into the downstream chamber 22, thus creating a liquid head. In this case, the liquid head is proportional to $R3^2-R4^2$.

Figure 2C:
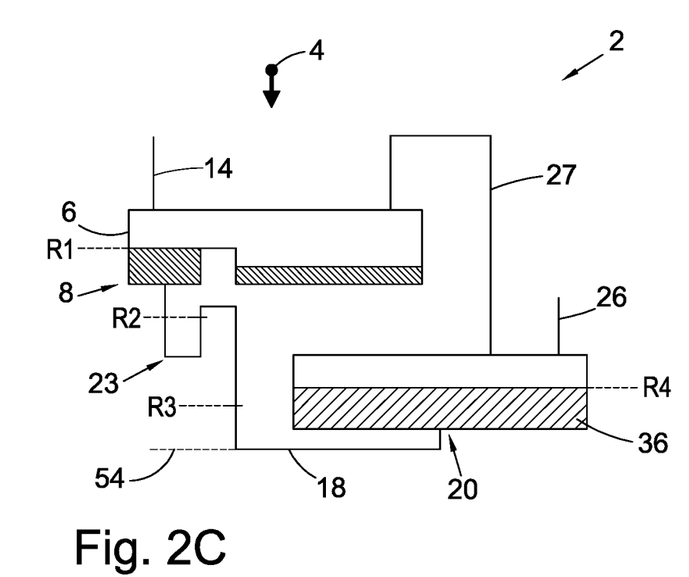
FIG. 2C illustrates schematically liquid flows within the device as illustrated in FIG. 1.

With reference to FIGS. 2C and 3, at step 7, the rotational frequency of the device is then increased in order to cause more liquid to flow from the upstream chamber 6 into the conduit 18, towards the downstream chamber 22. Initially, R2 moves radially outwards, as liquid flows from the upstream chamber 6 radially outwards. As it does so, the liquid head provided by the second liquid (in the upstream chamber 6 and the conduit 18) increases.

In practice, R1 will move radially outwards as liquid flows out of the upstream chamber, but since the circumferential extent (otherwise referred to as the angular extent) of the metering portion of the upstream chamber is much larger than the width of the first conduit, the fill level of liquid in the upstream chamber 6 (R1) can be approximated as being substantially constant, at least while gas is trapped in the first conduit.

In order to balance out this increased pressure from the liquid head provided by the second liquid, more liquid flows from the conduit 18 back into the downstream chamber 22, thus increasing the liquid head. The trapped gas is moved further along the first conduit, towards the downstream chamber as the liquid column increases.

Again, in practice, R4 will move radially inwards as liquid flows into the downstream chamber 22, but since the circumferential extent (otherwise referred to as the angular extent) of the downstream chamber is much larger than the width of the first conduit, the fill level of liquid in the downstream chamber (R4) can be approximated as being substantially constant, at least while gas is trapped in the first conduit.

Once liquid in the conduit 18 rounds the first bend 23, R2 starts to move radially inwards. Accordingly, the liquid head provided by the second liquid decreases.

Figure 2D:
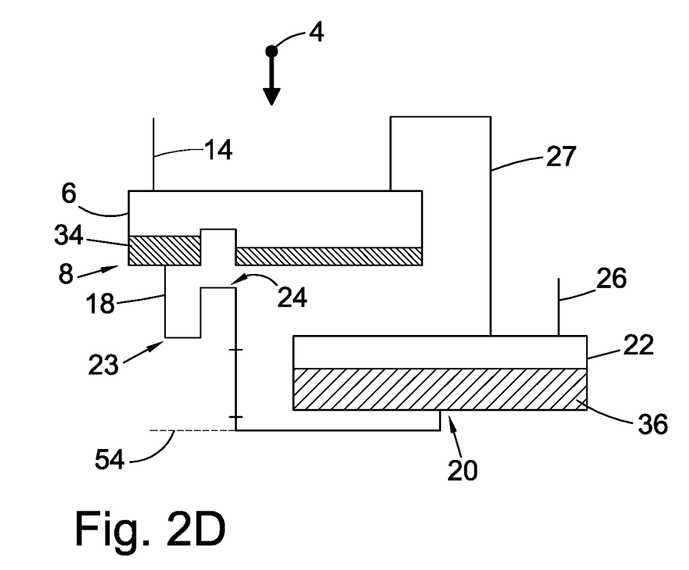
FIG. 2D illustrates schematically liquid flows within the device as illustrated in FIG. 1.

With reference to FIG. 2D, the rotational frequency is increased further and more liquid is urged into the conduit 18 from the upstream chamber 6. As a result, the second liquid moves past the crest 24 in the first conduit. R2 then begins to move radially outwards again and the liquid head provided by the first liquid starts to increase again.

To balance out this increased pressure, liquid flows from the first conduit back into the downstream chamber to increase the liquid head provided by the first liquid 36 and R3 moves radially outwards. The trapped gas is moved further along the first conduit, towards the downstream chamber 22.

Once R3 reaches the radially outermost point of the first conduit, labelled 54 in the figures, the liquid head provided by the first liquid (in the downstream chamber and the first conduit) reaches its maximum value (since the distance between the radially-outermost point of the conduit 18 and the fill level of liquid in the downstream chamber 22 is the greatest radial extent that the first liquid can have). Meanwhile, the liquid head provided by the second liquid is still increasing, as R2 moves radially outwards.

Figure 2E:
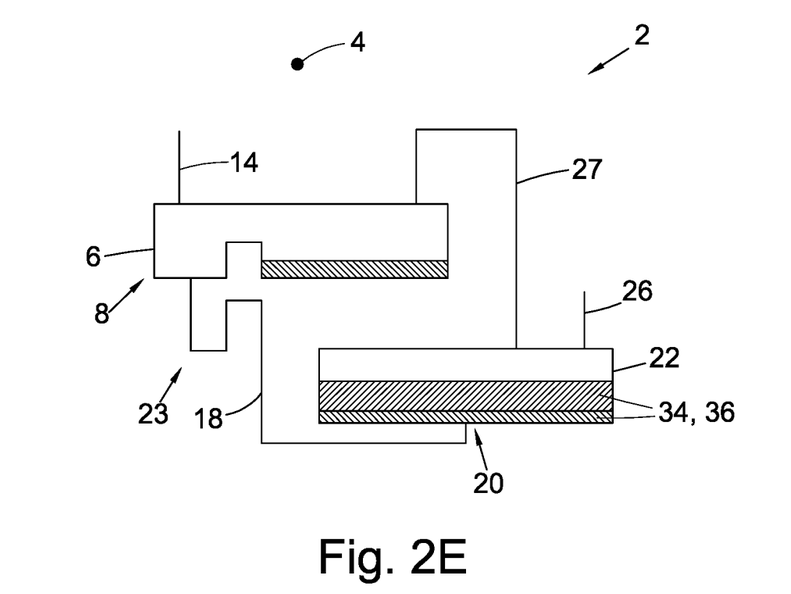
FIG. 2E illustrates schematically liquid flows within the device as illustrated in FIG. 1.

With reference to FIG. 2E, eventually, the liquid head provided by the second liquid increases to a level which overcomes the liquid head provided by the first liquid. The moment at which this happens is the first moment at which the following inequality is satisfied:

$$R2^2-R1^2 > R3^2-R4^2$$

As mentioned above, this is an approximation based on the assumption that the fill levels in each of the upstream and downstream chambers remain constant. In practice, the fill level in the upstream chamber will fall and the fill level in the downstream chamber will increase and this will need to be taken into account in the design of the device. Of course, once the trapped gas has been vented into the downstream chamber 22 and once liquid starts flowing from the upstream chamber into the downstream chamber, the upstream chamber will gradually empty and the downstream chamber will fill.

When the liquid head provided by the second liquid is greater than the liquid head provided by the first liquid, the liquid head provided by the first liquid is no longer able to balance out the pressure provided by the second liquid. Accordingly, more liquid flows from the upstream chamber 6 into the first conduit 18 and the second liquid and the trapped gas move along the first conduit 18, towards the downstream chamber until the trapped gas crosses a radially outermost point of the first conduit 18. The trapped gas is then vented into the downstream chamber (through the first liquid) and liquid from the upstream chamber is transferred into the downstream chamber.

It will be appreciated that the respective fill levels in each of the chambers will not remain substantially constant if the respective chamber is continuously filled whilst the above-described liquid sequencing is ongoing.

Figure 4:
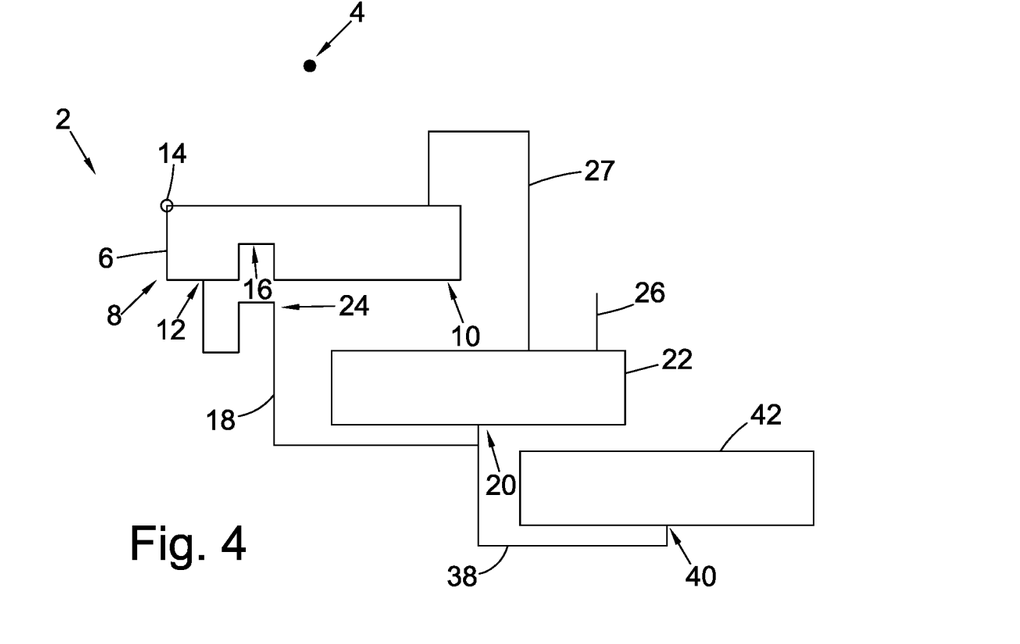
FIG. 4 illustrates schematically a further liquid handling device for combining a second liquid with a first liquid.

With reference to FIG. 4, a further embodiment of the structure described above is illustrated. The device further comprises an unvented chamber 42, which has a second port 40. A second conduit 38 connects the downstream chamber 22 to the port 40 of the unvented chamber 42. The port 40 of the unvented chamber is disposed in a radially-outermost aspect of the unvented chamber 42. In some embodiments, the port 40 is disposed elsewhere in the unvented chamber.

In particular, the conduit 38 is connected to the conduit 18 at a point which is radially outwards of the port 20. When liquid is present in the portion of the conduit 18 between the point of connection of the first and second conduits and the port 20 of the downstream chamber, this additional liquid (as opposed to if the conduit 38 was connected to a port of the downstream chamber 22 separate to the port 20) provides additional liquid head which serves to increase the rotational frequency at which the device must be rotated in order to vent the gas trapped in the first conduit into the downstream chamber 22. It may thus aid in preventing the gas trapped in the first conduit from being vented as soon as rotation is begun.

In some embodiments, the downstream chamber may comprise a further port, separate to the first port, to which the conduit 38 is connected.

Liquid flows in the device 2 as illustrated in FIG. 4 will now be described with reference to FIGS. 5A, 5B, 5C and 5D.

Figure 5A:
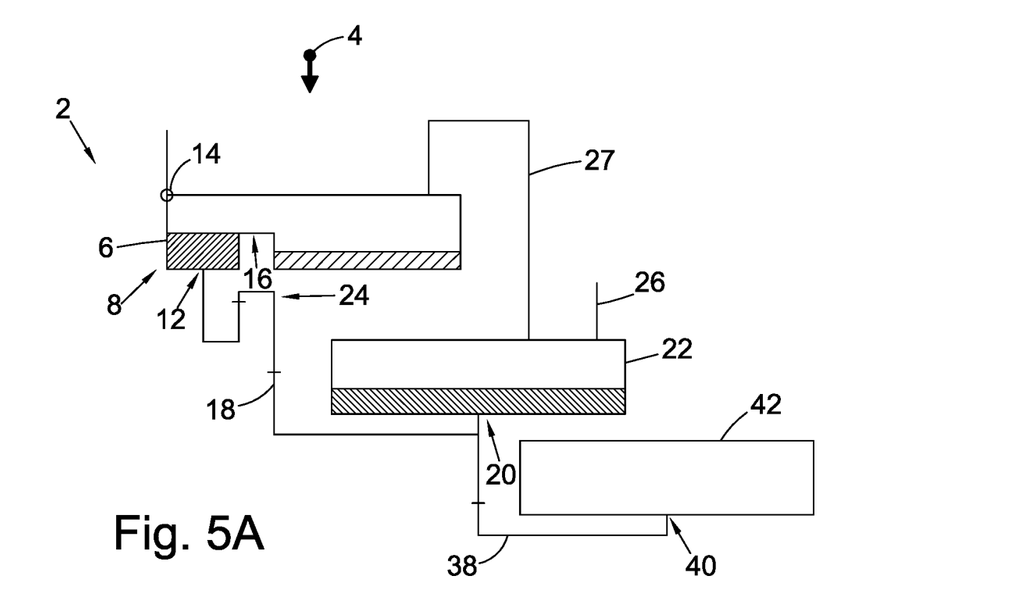
FIG. 5A illustrates schematically liquid flows within the device as illustrated in FIG. 1.

With reference to FIG. 5A, as for the device illustrated in FIG. 1, a first liquid is transferred into the downstream chamber 22 and a second liquid is then transferred into the upstream chamber 6 to trap gas in the conduit 18 between respective liquids from the upstream chamber 6 and downstream chamber 22. Some liquid may overflow into overflow portion 10 of the upstream chamber 6.

Figure 5B:
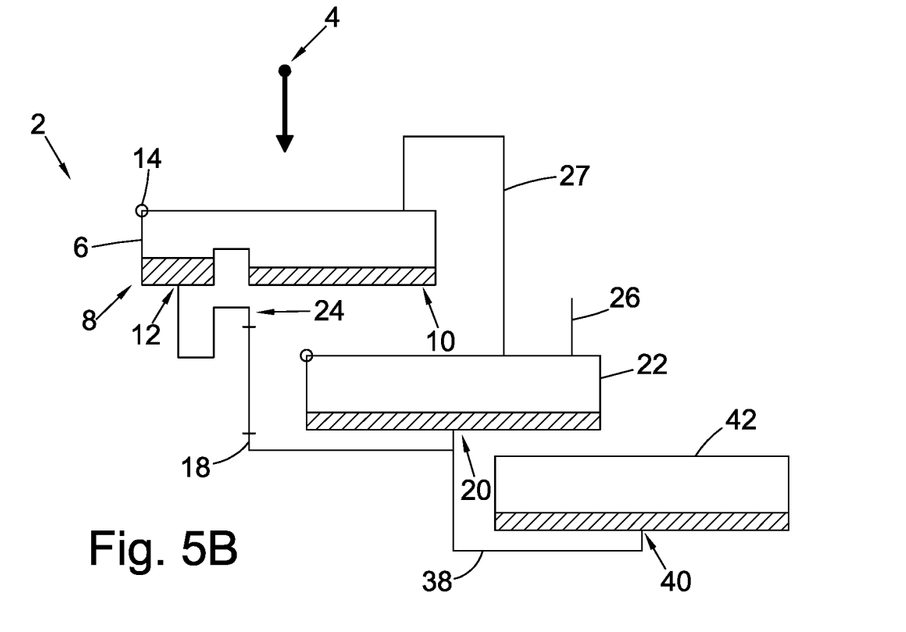
FIG. 5B illustrates schematically liquid flows within the device as illustrated in FIG. 1.

With reference to FIG. 5B, the device 2 is then rotated in order to transfer more liquid from the upstream chamber 6 into the conduit 18. Rotating the device 2 also causes liquid to be transferred from the downstream chamber 22 into the conduit 38.

As liquid flows along the conduit 38, gas in the conduit is displaced into the unvented chamber 42, where it is trapped. As liquid flows along the conduit 38, a pressure of gas in the unvented chamber 42 increases as the gas is compressed. For a given rotational frequency, an equilibrium point is eventually reached in which the gas pressure balances the centrifugal forces acting to cause liquid to flow along the conduit 38, towards the unvented chamber 42. Depending on the dimensions of the unvented chamber 42, the conduit 38 and the volume of liquid initially transferred into the downstream chamber 22, liquid may or may not enter the unvented chamber 42.

As above, the rotational frequency of the device 2 is increased, thus increasing the liquid head provided by the second liquid (in the upstream chamber and the conduit 18). However, as some of the first liquid has been transferred from the downstream chamber into the second conduit (and optionally into the unvented chamber), there is less liquid in the downstream chamber to provide a liquid head to balance the liquid head provided by the second liquid (as opposed to when the device does not comprise an unvented chamber 42 as herein described). Accordingly, the liquid head on the downstream side of the device may be easier to overcome in embodiments in which the device comprises an unvented chamber.

Liquid from the upstream chamber 6 will be transferred into the downstream chamber 22 when the liquid head provided by the second liquid is greater than the liquid head that can be provided by the first liquid.

Figure 5C:
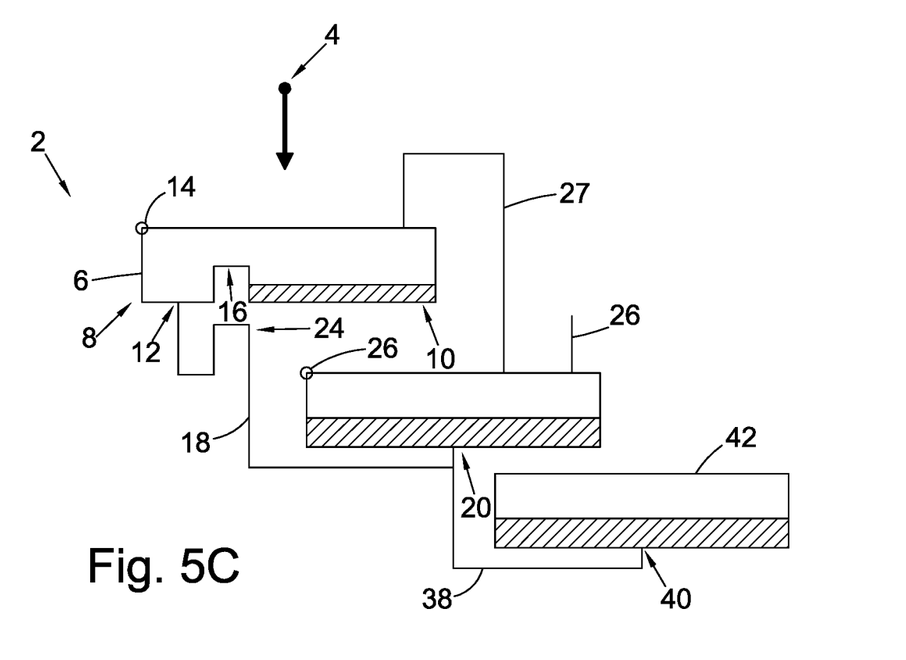
FIG. 5C illustrates schematically liquid flows within the device as illustrated in FIG. 1.

With reference to FIG. 5C, the rotational frequency of the device is increased to a level which causes the gas trapped in the conduit 18 to be vented into the downstream chamber 22 and liquid from the upstream chamber 6 to enter the downstream chamber 22, as described above.

Figure 5D:
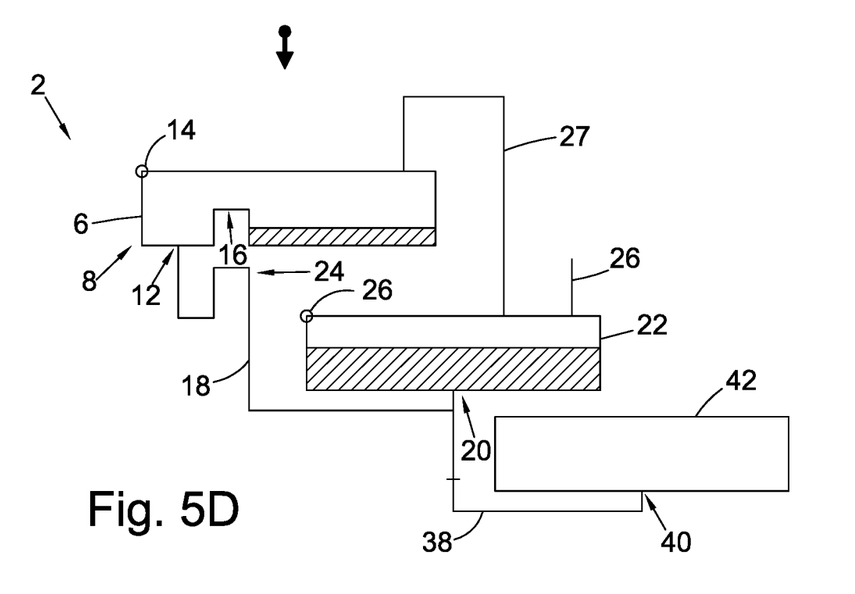
FIG. 5D illustrates schematically liquid flows within the device as illustrated in FIG. 1.

With reference to FIG. 5D, the rotational frequency of the device is then reduced. As a result, the gas trapped in the unvented chamber 42 expands and forces liquid in the conduit 38 and unvented chamber 42 back into the downstream chamber 22, where it combines with liquid in the downstream chamber 22, some of which is the second liquid from the upstream chamber 6.

Accordingly, the embodiment illustrated in FIG. 4 facilitates a reduction in the rotational speed necessary to transfer liquid from the upstream chamber into the downstream chamber.

In some embodiments, the method may comprise rotating the device at or above a threshold rotational frequency such that, when the device is rotated at or above the threshold frequency, all of the liquid in the downstream chamber 22 is transferred out of the downstream chamber, into the conduit 38 (and optionally the unvented chamber 42). If the liquid is forced far enough along the conduit 38, past the point at which the first conduit is connected to the second conduit, the port 20 of the downstream chamber 22 becomes clear of liquid and the gas trapped in the conduit 18 is immediately vented into the downstream chamber 22.

When this occurs, liquid flows from the upstream chamber 6 into the downstream chamber 22. The rotational frequency of the device can then be reduced to allow the gas trapped in the unvented chamber 42 to expands, thus transferring liquid back into the downstream chamber 22 from the conduit 38 (and optionally the unvented chamber 42).

The device may be designed so as to set the threshold frequency. This may be done to ensure that the threshold frequency is sufficiently low as to be practical. This may be achieved by selection of the dimensions of the unvented chamber 42 and the conduit 38, as well as the relative radial positions of the downstream chamber 22 and the unvented chamber 42.

It will be appreciated that in embodiments in which the first port of the downstream chamber 22 is radially inwards of a radially-outermost aspect of the downstream chamber 22, in order to clear the port 20 of liquid (so that the gas trapped in the conduit 18 is vented into the downstream chamber 22), the downstream chamber 22 need not be emptied entirely of liquid. Instead, the port 20 becomes clear of liquid if a fill level of liquid in the downstream chamber 22 falls to be radially outwards of the port 20.

In some embodiments in which liquid is transferred from the downstream chamber 22 into the conduit 38, the rotational frequency of the device may be reduced in order to allow the gas trapped in the unvented chamber to expand, thus forcing liquid back along the conduit 38 and into the downstream chamber 22. The rotational frequency of the device may then be increased again in order to transfer liquid from the downstream chamber 22 back into the conduit 38. This process of reducing and increasing the rotational frequency in order to move liquid back and forth, out of and back into the downstream chamber 22 may be repeated one or more times and may be used in order to mix the liquid. In some embodiments, one or more dry reagents may be disposed in the device, for example in one or more of the unvented chamber 42, the downstream chamber 22, the conduit 38, and the upstream chamber 6. The described method of moving liquid back and forth may be advantageous is promoting mixing of the one or more dry reagents with liquid.

This mixing process may be carried out either:
 prior to increasing the rotational frequency of the device 2 to a sufficiently high level to cause liquid to flow from the upstream chamber 6 into the downstream chamber 22 (in this case, the first liquid 36 only is mixed, for example with one or more dry reagents) or
 subsequent to increasing the rotational frequency of the device 2 to a sufficiently high level to cause liquid to flow from the upstream chamber 6 into the downstream chamber 22 (in this case, the second liquid 34 from the upstream chamber and the first liquid 36 are mixed together, optionally also with one or more dry reagents)

Figure 6:
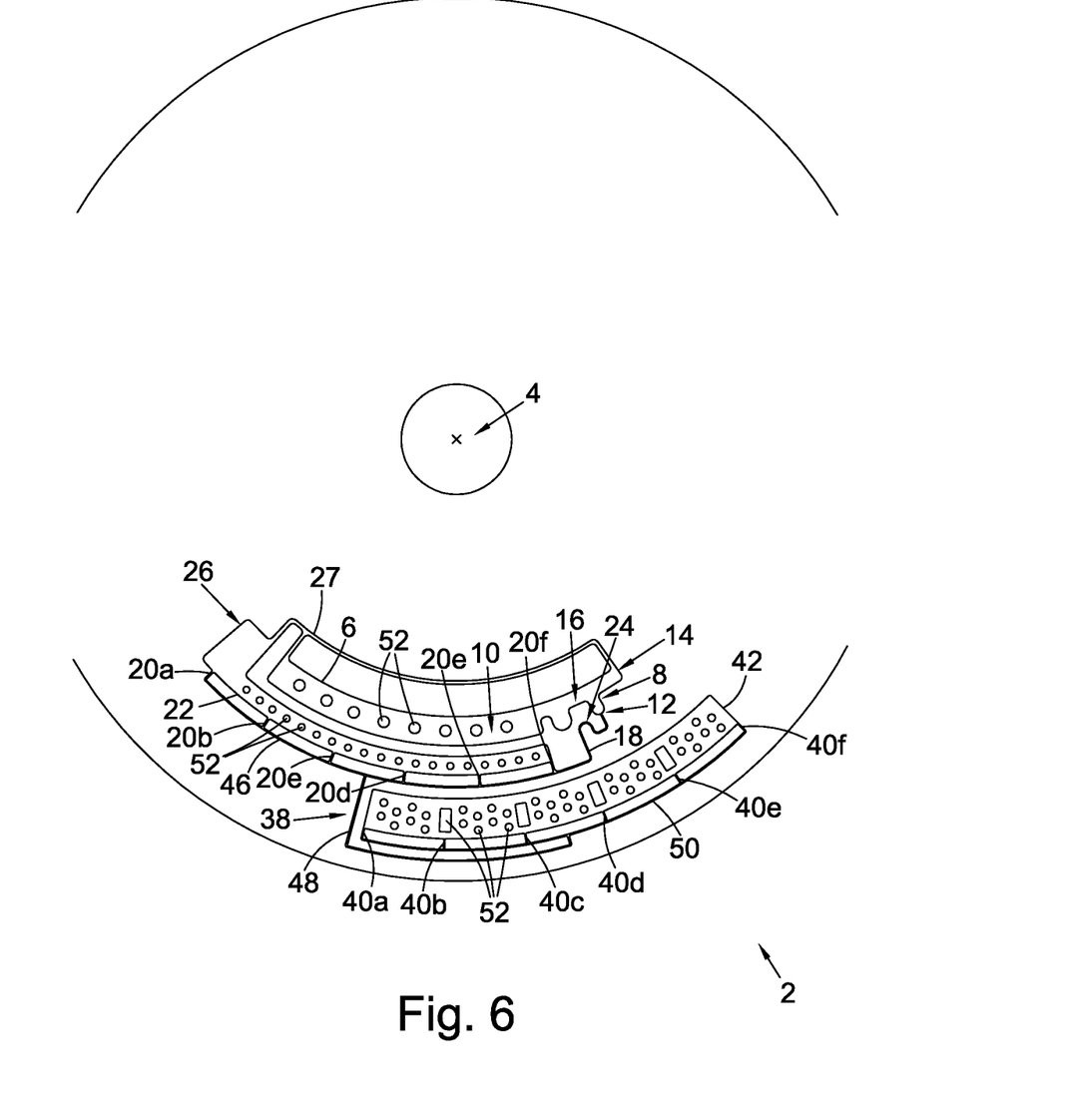
FIG. 6 illustrates an implementation of the structures illustrated schematically in FIG. 3.

With reference to FIG. 6, an implementation of the structure illustrated schematically in FIG. 4 is described. Like parts are labelled with like reference numerals and a description of these like parts will not be repeated here.

The downstream chamber 22 comprises a plurality of outlets 20a, 20b, 20c, 20d, 20e and 20f. The ports are connected to the conduit 18. The conduit 18 comprises a number of elements as will now be described. Each of the plurality of ports is connected to a radially aligned conduit portion, each of which is connected to a circumferentially aligned conduit portion 46. In turn, conduit portion 46 is connected to a common conduit portion 48. The common conduit portion 48 is connected to a second circumferentially aligned conduit portion 50, which in turn is connected to a plurality of radially-aligned conduit portions, each of which is connected to one of the plurality of ports 40a, 40b, 40c, 40d, 40e and 40f of the unvented chamber. The plurality of ports in the downstream and unvented chambers help promotes intermingling and mixing of the liquid. One or more dry reagents may be disposed within the device 2, for example in the unvented chamber 42, the conduit 38, the downstream chamber 22, the upstream chamber 6 and/or the conduit 18 and in this case, the plurality of ports aid in promoting mixing of the liquid with the one or more reagents.

Each of the unvented chamber 42, the upstream chamber 6 and the downstream chamber 22 comprise a plurality of pillars 52 to give structural support to the chamber walls. The pillars extend from one side of the disc to the other, parallel to the axis of rotation 4.

Liquid flows through the device as illustrated in FIG. 6 in the same way as is described with reference to FIGS. 5A, 5B, 5C and 5D.

In any of the embodiments described above, the downstream chamber may be connected to further downstream liquid handling structures to supply mixed liquid to the downstream liquid handling structures, for example via a capillary siphon, capillary valve or any other means of liquid flow control. The downstream liquid handling structures may comprise a detection chamber, for example.

Figure 7:
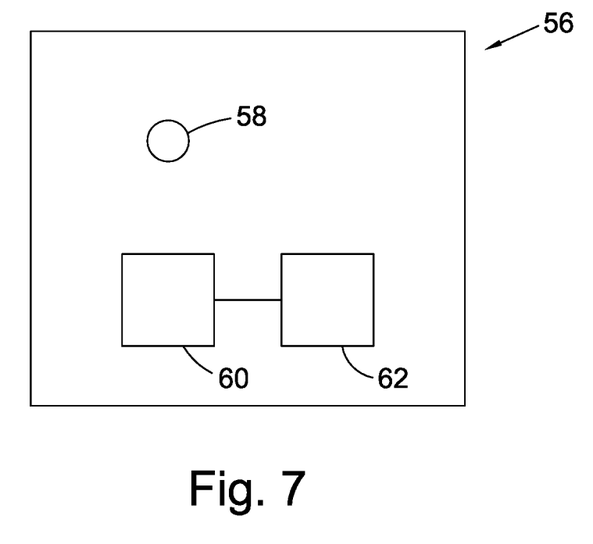
FIG. 7 illustrates schematically a drive system configured for use with a device as described herein.

With reference to FIG. 7, a system 56 for driving liquid flows in the device 2 comprises a device engaging feature 58, for example a spindle with spring-loaded prongs for engaging a corresponding feature of the device, a tray and hub arrangement or any other arrangement for engaging the device 2, for example as commonly found in CD or DVD drives. The engaging feature 58 is coupled to an electric motor 60 which is controlled by a controller 62 configured to implement rotational speed protocols to drive liquid flows as described above.

As can be seen from above, the time at which liquid from the upstream chamber is transferred into the downstream chamber can be controlled by controlling the rotational frequency of the device. The liquid in the upstream chamber and the liquid in the downstream chamber may be the same liquid. In this case, the devices and methods described herein can be used to sequence liquid flow. In other words, they may be used to keep two volumes of liquid (in the upstream and downstream chambers respectively) until it is desired to combine them.

In some embodiments, the first and second liquids may be different liquids. In this case, the devices and methods described herein may be used first to meter a volume of liquid, for example in the upstream chamber, and then to inject the metered volume of liquid into the downstream chamber at a time which may be controlled by controlling the rotational frequency of the device. In some embodiments, the first and second liquids may be the same liquid.

The first and second liquids can each be any liquid. Examples include a blood sample (whole or lysed blood), plasma, urine, serum, saline solution or another buffer, particle suspensions (e.g. latex beads, nano-particles), reaction mixture, etc.

In some embodiments, the device is a microfluidic device. For the avoidance of doubt, the term "microfluidic" is referred to herein to mean devices having a fluidic element such as a reservoir or a channel with at least one dimension below 1 mm. The device may be configured to handle volumes of liquid on the scale of nanolitres to microlitres. Some but not necessarily all of the structures on such a device may be microfluidic.

In some embodiments, the liquid handling structures in a device as described herein, such as the cavities, chamber and channels, are moulded or stamped in a substrate (which may also be referred to as a carrier disc). A cover foil is then attached to the substrate to form the chambers and other structures. Equally, two discs may be joined together to form the liquid handling structures.

The above description has been made in terms of specific embodiments for the purpose of illustration and not limitation. Many modifications and combinations of, and alternatives to, the features described above will be apparent to a person skilled in the art and are intended to fall within the scope of the invention, which is defined by the claims that follow.

For example, while conduits have been described above with reference to drawings depicting channel shaped conduits, it will be understood that the term "conduit" covers any arrangement providing a flow path conveying or conducting liquid from one part of the device to another. Accordingly, a conduit with a bend or crest, as described above for the conduit 18, can, for example, be implemented as a bent channel as depicted schematically in the drawings, or more generally as any structure that can contain liquid, has an inlet, and an outlet and is shaped or configured so that liquid flowing from the inlet to the outlet first flows radially outward (or, respectively, inward) to an inflection point and then flows radially inward (or, respectively, outward). The conduits described herein in various embodiments are thus defined by their function and a shape or configuration necessary to achieve that function, rather than being limited to any specific shape or configuration beyond that which is necessary to achieve the respective described functions.

Likewise, while chambers have been described above with reference to drawings depicting chambers of a certain form factor, it will be appreciated that the disclosure is not so limited and that the described chambers may take any suitable shape or configuration, for example have varying depth, be significantly elongate to resemble a channel, for example a serpentine or meandering channel, be formed by a network of channels or cavities, contain pillars, comprise interconnected volumes, etc. Thus, the upstream, downstream and unvented chambers described herein in various embodiments are not limited by any specific shape or configuration beyond what is necessary to achieve the respective described function of, respectively, providing liquid to the unvented chamber, receiving liquid from the unvented chamber, and containing gas pressurised as a result of displacement by received liquid.

Methods have been described above that require control of a drive system. The control steps may be implemented in software, hardware or a combination thereof, and may involve a single hardware component such as a general purpose processor or application specific integrated circuit or distributed in any way between a number of processors and integrated circuits. The components of the drive system may be provided in a single device or may be distributed in any suitable manner between a number of devices.

The invention claimed is:

1. A liquid handling device having an axis of rotation about which the device can be rotated to drive liquid flow in the device, the device comprising:

an upstream chamber comprising an outlet;

a downstream chamber comprising a proximal portion radially inwards of a distal portion and comprising a first port disposed in the distal portion; and a first conduit which connects the outlet of the upstream chamber to the first port of the downstream chamber wherein the first conduit includes a crest having a crest inlet and a crest outlet, the crest configured such that liquid flowing from the crest inlet flows radially inward to an inflection point and then flows radially outward from the inflection point to the crest outlet;

wherein a distance between the axis of rotation and the crest is greater than or equal to a distance between the axis of rotation and the outlet of the upstream chamber; and wherein the first port of the downstream chamber is positioned radially outwards from the crest.

2. A liquid handling device as claimed in claim 1, where the first port is disposed in a radially-outermost aspect of the downstream chamber.

3. A liquid handling device as claimed in claim 1, wherein the first conduit extends radially outwards of the first port between the first port and the crest.

4. A liquid handling device as claimed in claim 1, wherein the upstream chamber comprises a metering portion and an overflow portion;

wherein a wall of the upstream chamber extends radially inwards to a bend and radially outwards from the bend to separate the overflow portion from the metering portion;

wherein the crest of the first conduit is radially outwards of the bend; and wherein the outlet is disposed in the metering portion of the upstream chamber.

5. A liquid handling device as claimed in claim 1, wherein the device comprises an unvented cavity connected to the downstream chamber.

6. A liquid handling device as claimed in claim 5, wherein the unvented cavity comprises:

an unvented chamber comprising a proximal portion radially inwards of a distal portion and comprising a second port disposed in the distal portion; and a second conduit which connects the downstream chamber to the second port of the unvented chamber.

7. A liquid handing device as claimed in claim 6, wherein the second conduit is connected to the first conduit at a point which is radially outwards of the first port of the downstream chamber.

8. A liquid handling device as claimed in claim 1, wherein the device comprises a feature which defines the axis of rotation and which is configured to be coupled to a rotational element to drive rotation of the device.

9. A liquid handling device as claimed in claim 1, wherein the upstream chamber has an upstream chamber proximal portion radially inwards of an upstream chamber distal portion, and wherein the outlet is disposed in the upstream chamber distal portion.

* * * * *

UNITED STATES PATENT AND TRADEMARK OFFICE
CERTIFICATE OF CORRECTION

PATENT NO. : 10,639,635 B2
APPLICATION NO. : 15/626890
DATED : May 5, 2020
INVENTOR(S) : Reis et al.

Page 1 of 1

It is certified that error appears in the above-identified patent and that said Letters Patent is hereby corrected as shown below:

In the Claims

Column 15, Line 23, in Claim 4, delete "handing" and insert --handling--

Column 16, Line 16, in Claim 7, delete "handing" and insert --handling--

Signed and Sealed this
Twenty-fifth Day of August, 2020

Andrei Iancu
*Director of the United States Patent and Trademark Office*